(12) United States Patent
Tong et al.

(10) Patent No.: US 8,275,337 B2
(45) Date of Patent: Sep. 25, 2012

(54) ADAPTIVE ARRAY WIRELESS COMMUNICATION APPARATUS AND METHOD OF SAME

(75) Inventors: Fangwei Tong, Kanagawa (JP); Kenta Okino, Kanagawa (JP); Shigeru Kimura, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 910 days.

(21) Appl. No.: 11/912,865

(22) PCT Filed: Apr. 27, 2006

(86) PCT No.: PCT/JP2006/308830
§ 371 (c)(1),
(2), (4) Date: Dec. 24, 2008

(87) PCT Pub. No.: WO2006/118191
PCT Pub. Date: Nov. 9, 2006

(65) Prior Publication Data
US 2009/0167311 A1      Jul. 2, 2009

(30) Foreign Application Priority Data

Apr. 27, 2005   (JP) .................................. 2005-130583

(51) Int. Cl.
*H04B 1/06* (2006.01)
(52) U.S. Cl. ..................... 455/272; 455/63.4; 455/562.1
(58) Field of Classification Search ................... 455/272
See application file for complete search history.

(56) References Cited

U.S. PATENT DOCUMENTS

| | | | |
|---|---|---|---|
| 5,581,876 A | 12/1996 | Prabhu et al. | |
| 2003/0123530 A1* | 7/2003 | Maeda et al. | ................. 375/148 |
| 2003/0236107 A1 | 12/2003 | Azuma | ......................... 455/561 |
| 2004/0176136 A1 | 9/2004 | Doi | ............................. 455/562.1 |
| 2007/0117513 A1* | 5/2007 | Kasami et al. | ............... 455/63.4 |

FOREIGN PATENT DOCUMENTS

| | | |
|---|---|---|
| JP | 01196928 A | 8/1989 |
| JP | 04304719 A | 10/1992 |
| JP | 10-154952 | 6/1998 |
| JP | 11504159 T | 4/1999 |
| JP | 2001-332925 | 11/2001 |
| JP | 2002280953 A | 9/2002 |
| JP | 2003-032167 | 1/2003 |
| JP | 2004-289407 | 10/2004 |
| WO | 9623321 A1 | 8/1996 |

OTHER PUBLICATIONS

Chinese language office action dated Feb. 1, 2011 and its English language translation for corresponding Chinese application 200680023402.7.
Japanese language office action dated Sep. 13, 2011 and its English language translation for corresponding Japanese application 2005130583 cites the foreign patent documents above.

* cited by examiner

*Primary Examiner* — Duc Nguyen
*Assistant Examiner* — Ajibola Akinyemi
(74) *Attorney, Agent, or Firm* — DLA Piper LLP (US)

(57) ABSTRACT

An adaptive array wireless communication apparatus able to suitably select antenna elements, small in amount of processing, fast in convergence speed, and suitable for transmission/reception, and a method of the same, which controls the directionalities of array antenna elements based on array weights, controls an antenna element selecting unit 23 so that the antenna elements are intermittently determined, and adjusts a period of determination of the antenna elements based on information of the antenna elements determined at a controlling unit 26.

8 Claims, 12 Drawing Sheets

ADAPTIVE ARRAY WIRELESS COMMUNICATION APPARATUS AND METHOD OF SAME

TECHNICAL FIELD

The present invention relates to an adaptive array wireless communication apparatus having an array antenna configured by a plurality of antenna elements and a method of same.

BACKGROUND ART

As an adaptive array wireless communication apparatus having an array antenna configured by a plurality of antenna elements, a variety of apparatuses are proposed (see for example Patent Documents 1 to 3).

For example, a communication apparatus of Patent Document 1 calculates array weights by using all array elements configuring the array when the adaptive array is applied and applies the array weights to all elements.

Further, the communication apparatuses of Patent Documents 2 and 3 select part of all of the array elements according to an order of received power of each array element and/or an order of correlation values of array elements and send and receive signals after that by the selected array elements.

Patent Document 1: Japanese Patent Publication (A) No. 11-504159

Patent Document 2: Japanese Patent Publication (A) No. 10-154952

Patent Document 3: Japanese Patent Publication (A) No. 2004-289407

DISCLOSURE OF THE INVENTION

Problem to be Solved by the Invention

However, the communication apparatuses disclosed in Patent Documents 1 to 3 have the following disadvantages.

In the communication apparatus disclosed in Patent Document 1, the reception levels of the different array elements differ with respect to a certain user due to fading and the arrangement position of the array elements in the actual environment. Accordingly, even when using array elements having low reception levels, they only contribute a little to improvement of the signal quality. The amount of processing just increases and the convergence speed just becomes slower.

Further, regarding the amount of processing, while depending on the adaptive algorithm, in general, when the number of elements is N, the amount of processing is propotion to $N^{}2$ ( indicates a power). For example, when N=8, the amount of processing is proportion to $8^{**}2=64$. Further, regarding the convergence speed as well, while depending on the adaptive algorithm, in general, this is propotion to a multiple of N. For example, when N=8, it is necessary to perform at least 16 times (2 times 8) repeated operations. Further, equivalently, sometimes 16 or more received samples become necessary.

When calculating the array weights by using all array elements configuring the array and applying the array weights to all elements as in this Patent Document 1, when the number of elements is large, the amount of processing is large as well and the convergence becomes slow. Further, in order to actually accomplish that amount of processing, a considerable DSP becomes necessary. The power consumption becomes large as well.

Further, since all array elements are utilized, nondirectional array elements are necessary so that all array elements can receive user signals appearing in all directions at random, so the merits of directional array elements no longer can be exhibited. Therefore, the distance which can be covered by the transmission/reception becomes small.

Further, the communication apparatuses disclosed in Patent Documents 2 and 3 select the antennas according to the order of the received powers or/and the order of the correlation values (from the smallest one), but this antenna selection method has the problem that a complex environment cannot be completely coped with.

For example, in an environment where there are only the desired signals, the array elements can be correctly selected according to the order of received powers or/and the order of correlation values (from the smallest one). However, in an environment where there are interference signals as well, the received powers include components of the interference signals as well. Accordingly, even when a received power is the largest, it is not known whether the power is the power of the desired signal or the power of the interference signal, so there is a possibility that the meaning of the order of the received powers will be lost and array elements will not be able to be correctly selected.

Further, regarding the order of correlation values (from the smallest one) as well, due to the presence of the interference components, the correlation values are influenced by the interference signals and the array elements cannot be correctly selected. Further, even when selecting the array elements by simultaneously using the order of received powers and the order of correlation values, the power values and correlation values themselves are influenced by the interference components, therefore the clear meaning is lost and the array elements cannot be correctly selected.

Further, in a complex case where a large number of user signals, large number of multi-path signals, and large number of interference signals, particularly unknown interference signals, are present in a signal propagation environment, even if assuming that the power of the desired signal and clearly defined correlation value can be measured and calculated, determination of the suitable selection criterion by the power value and correlation value itself soon becomes very difficult.

For example, if selecting array elements by using a criterion for canceling interference signals, there is a possibility that array elements having low reception levels of the desired signal will be selected.

Conversely, when selecting array elements by using a criterion enabling reception of a desired signal to the maximum limit, there is a possibility that the interference cancellation effect will become bad.

Next, selected array elements are fixed after the antennas are selected. Therefore, when the signal conditions with the other party of transmission/reception change (for example, when a user of a mobile station is moving at a high speed), the other party can no longer be tracked, transmission/reception cannot be performed well, and sometimes the transmission/reception itself sometimes becomes impossible.

Further, in the communication apparatuses disclosed in Patent Documents 2 and 3, the calculation of the power of each antenna and the correlation value between antennas itself requires processing.

In particular, when calculating the correlation value between antennas, when for example there are eight antennas, $(8\times7)/2=28$ calculations of correlation become necessary. Assuming that 16 complex number multiplication operations are necessary for a single correlation operation, $28\times16=448$ complex number multiplication operations become necessary. This already ends up exceeding the amount of processing when all elements are utilized.

Further, in the calculation of the powers, the amount of processing is smaller than that of the calculation of the correlation values, but if assuming that for example 10 complex number multiplication operations are necessary for a single power calculation, 10 ×8=80 complex number multiplication operations become necessary for the calculation of the received powers of eight antennas.

Accordingly, even if reducing the precision of the processing of the correlations and powers and reducing the required number of complex number multiplication operations, a certain degree of processing is clearly required. Further, even if not calculating just the received power, but calculating just a specific received signal, for example, the power of the desired signal, processing able to separate a specific signal from among received signals is necessary. A considerable amount of processing becomes necessary for this separation as well.

As described above, the apparatus disclosed in Patent Document 1 calculates the array weights by using all array elements and applies the array weights to all array elements. In this method, however, calculation of the array weights always becomes necessary even for array elements having low reception levels (array elements contributing little to the adaptive array), so the amount of processing increases, and the convergence speed becomes slow.

Further, in the apparatuses disclosed in Patent Documents 2 and 3, the array elements used for transmission/reception are selected based on the order of powers of the signals received at all array elements and the order of correlation values. In these selection methods, however, the powers of interference signals are referred to as well, therefore the array elements suitable for transmission/reception are not adequately selected.

An object of the present invention is to provide an adaptive array wireless communication apparatus able to suitably use antenna elements small in amount of processing, fast in convergence speed, and suitable for transmission/reception and a method of the same.

Means for Solving the Problem

A first aspect of the present invention is an adaptive array wireless communication apparatus having an array antenna configured by a plurality of antenna elements, comprising an array weight generating unit generating weight coefficients for received signals received at the plurality of antenna elements, an antenna element determining unit determining antenna elements used for transmission/reception based on the weight coefficients generated at the array weight generating unit, a weighting unit weighting received signals or/and transmission signals of the antenna elements determined by the antenna element determining unit, and a directionality controlling unit controlling the directionality of the array antenna by the weighting by the weighting unit.

A second aspect of the present invention is an adaptive array wireless communication apparatus having an array antenna configured by a plurality of antenna elements, comprising an array weight generating unit generating weight coefficients for received signals received at the plurality of antenna elements, an antenna element determining unit determining antenna elements used for transmission/reception based on the weight coefficients generated at the array weight generating unit, a weighting unit weighting each received signal or/and each transmission signal of the antenna elements determined by the antenna element determining unit, a directionality controlling unit controlling the directionality of the array antenna by the weighting by the weighting unit, and a controlling unit of an antenna element determination period controlling the antenna element determining unit so that the determination of the antenna element is intermittently carried out, and adjusting the period of determination at the antenna element determining unit based on information of the antenna elements determined by the antenna element determining unit.

Preferably, the period is adjusted by comparing a combination of antenna elements determined by the antenna element determining unit and a combination of antenna elements determined a previous time, making the period long when the two combinations are the same, and making the period short when the two combinations differ.

Preferably, the period is adjusted by calculating an inner product of a present array weight vector in the antenna elements determined by the antenna element determining unit and a previous array weight vector, making the period long when the inner product is larger than a threshold value, and making the period short when the inner product is smaller than the threshold value.

Preferably, the controlling unit of the antenna element determination period adjusts the period so that it becomes a time set in advance when the period in longer than that set time.

Preferably, the controlling unit of the antenna element determination period calculates the inner product of a present array weight vector in an antenna elements determined by the antenna element determining unit and a previous array weight vector and controls the antenna element determining unit so that all antenna elements are used at the next generation of weight coefficients when the inner product is smaller than a threshold value.

A third aspect of the present invention is a wireless communication method for wireless communication by an adaptive array wireless communication apparatus having an array antenna configured by a plurality of antenna elements, comprising an array weight generating step of generating weight coefficients for received signals received at the plurality of antenna elements, an antenna element determining step of determining antenna elements used for transmission/reception based on the weight coefficients generated at the array weight generating step, a weighting step of weighting received signals or/and transmission signals of the antenna elements determined by the antenna element determining step, and a directionality controlling step of controlling the directionality of the array antenna by the weighting by the weighting step.

A fourth aspect of the present invention is a wireless communication method for wireless communication by an adaptive array wireless communication apparatus having an array antenna configured by a plurality of antenna elements, comprising an array weight generating step of generating weight coefficients for received signals received at the plurality of antenna elements, an antenna element determining step of determining antenna elements used for transmission/reception based on the weight coefficients generated at the array weight generating step, a weighting step of weighting each received signal or/and each transmission signal of the antenna elements determined by the antenna element determining step, a directionality controlling step of controlling the directionality of the array antenna by the weighting by the weighting step, and a controlling step of an antenna element determination period of controlling the antenna element determining step so that the determination of the antenna element is intermittently carried out, and adjusting the period of determination at the antenna element determining step based on information of the antenna elements determined by the antenna element determining step.

Preferably, the period is adjusted by comparing a combination of antenna elements determined by the antenna element determining step and a combination of antenna elements determined a previous time, making the period long when the two combinations are the same, and making the period short when the two combinations differ.

Preferably, the period is adjusted by calculating an inner product of a present array weight vector in the antenna elements determined by the antenna element determining step and a previous array weight vector, making the period long when the inner product is larger than a threshold value, and making the period short when the inner product is smaller than the threshold value.

Preferably, the controlling step of the antenna element determination period adjusts the period so that it becomes a time set in advance when the period is longer than that set time.

Preferably, the controlling step of the antenna element determination period calculates the inner product of a present array weight vector in an antenna elements determined by the antenna element determining step and a previous array weight vector and controls the antenna element determining step so that all antenna elements are used at the next generation of weight coefficients when the inner product is smaller than a threshold value.

Effect of the Invention

According to the present invention, it is possible to suitably determine antenna elements small in amount of processing, fast in convergence speed, and suitable for communication and possible to use the determined antenna elements for weighting, so improve the directionality of an array antenna.

DESCRIPTION OF NOTATIONS

10—adaptive array wireless communication apparatus, 20R—reception system, 20S—transmission system, 21—antenna array unit, 211—cylindrical reflection plate, 22—RF unit, 23—antenna element selecting unit, 24—array weight calculating unit, 25R—weighted synthesizing unit, 25A—weighting unit, 26—controlling unit, and 27—antenna switch.

BEST MODE FOR CARRYING OUT THE INVENTION

Below, an embodiment of the present invention will be explained with reference to the accompanying drawings.

Figure 1:
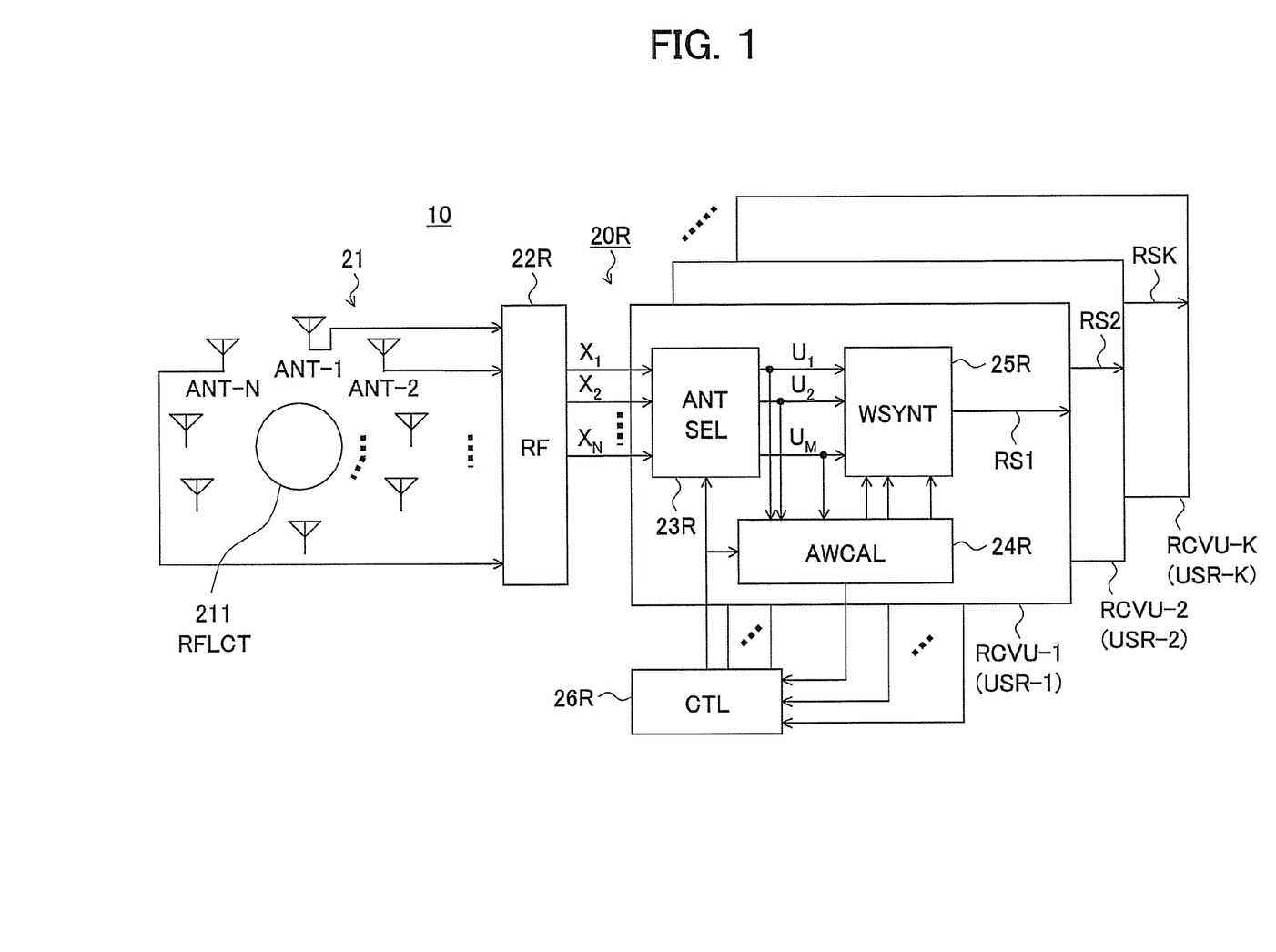
FIG. 1 is a block diagram showing an example of the configuration of a reception system of an adaptive array wireless communication apparatus according to the present embodiment.
Figure 2:
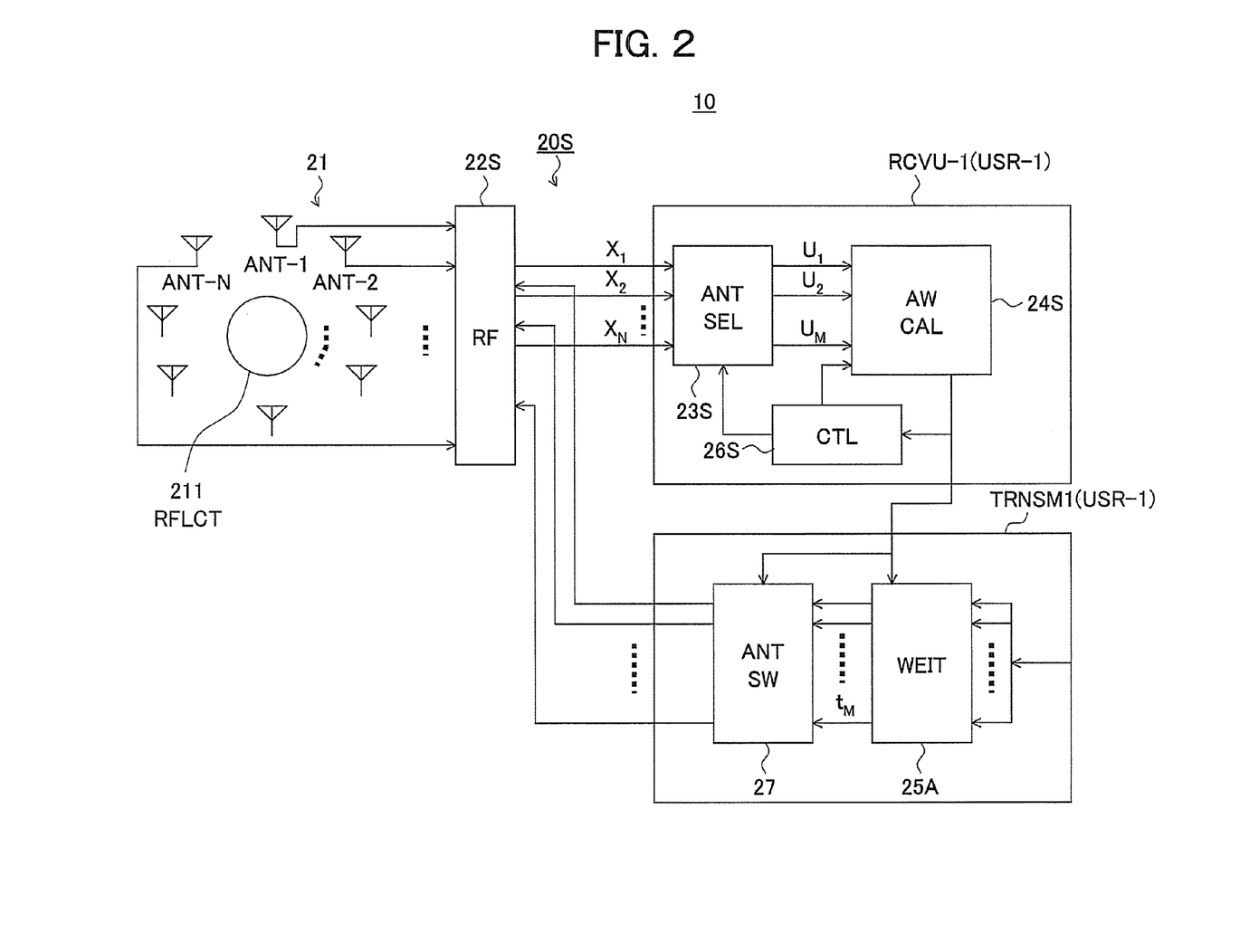
FIG. 2 is a block diagram showing an example of the configuration of a transmission system of an adaptive array wireless communication apparatus according to the present embodiment.

FIG. 1 and FIG. 2 are block diagrams showing an example of the configuration of an adaptive array wireless communication apparatus according to the present embodiment, wherein FIG. 1 shows a reception system, and FIG. 2 shows a transmission system.

An adaptive array wireless communication apparatus 10 according to the present embodiment, in order to achieve a reduction of the amount of processing in the adaptive array processing and an improvement of the convergence speed, determines antenna elements used for the transmission/reception from among the plurality of antenna elements configuring the adaptive array. In the present embodiment, by determining the antenna elements used for the transmission/reception based on the weight coefficients for the received signals received at a plurality of antenna elements, weighting the received signals of the determined antenna elements, and controlling the directionality of the antenna, the amount of processing of the weighted synthesis is effectively reduced to improve the convergence speed and improve the directionality of the antenna.

Note that, in the present embodiment, an "absolute value of the weight coefficient (array weight)" means an amplitude of a complex number weight.

Further, the reason for the selection of an antenna element having a large absolute value of the weight coefficient is that a signal weighted by a weight coefficient having a large absolute value contributes to the improvement of the quality of the weighted summed signal.

In the present embodiment, there is provided an array antenna transmission/reception system using a plurality of (three or more) antenna elements wherein the optimum part of the antenna elements is adaptively determined from among the antenna elements and the adaptive array is applied to only the determined elements. Due to this, an adaptive array transmission/reception apparatus reducing the amount of processing and improving the convergence speed and, at the same time, using a reflection plate or directional antenna elements to double a range of coverage of the transmission/reception is provided.

In the present embodiment, the optimum part of the antenna elements is adaptively determined according to a standard such as the MMSE from among all receiving antenna elements for a certain user.

Further, in the next reception slot of the corresponding user, the array weights are calculated and the adaptive array is applied for only the determined number of antennas.

Further, the processing for adaptively determining the optimum part of the antenna elements from among all receiving antenna elements is intermittently carried out to dynamically track the radio wave conditions between the transmission/reception parties.

Further, the time interval for performing the processing for determining the optimum part of the antenna elements is adaptively adjusted in accordance with the fluctuation of the radio wave conditions between the transmission/reception parties.

Further, in the present embodiment, when the antenna elements of the array are circularly arranged (here, square and triangular arrangements are also deemed circular arrangements), a reflection plate is disposed inside the circle. Alternatively, directional antennas are used for the array elements to forcibly block reception from unnecessary directions or/and transmission to unnecessary directions. Due to this, the apparatus is configured to suppress frequent change of the determined antenna elements, increase reception sensitivity, increase the transmission power to the transmission direction while maintaining the transmission power of a transmitter as it is, or reduce the transmission power of the transmitter while maintaining the transmission power to the transmission direction as it is.

Below, the adaptive array wireless communication apparatus of the present embodiment will be concretely explained using a reception system 20R and a transmission system 20S of FIG. 1 and FIG. 2 as examples.

Note that, here, for convenience of explanation, an explanation will be given taking as an example a case where the array is circular and applied to a base station of mobile communications.

The reception system 20R, as shown in FIG. 1, has an antenna array unit 21 having a plurality of array antenna elements ANT-1 to ANT-N arranged in a circular state and a cylindrical reflection plate (RFLCT) 211, an RF unit (RV front end unit) 22R, an antenna element selecting unit (ANTSEL) 23R provided for each user, an array weight calculating unit (AWCAL) 24R serving as the array weight generating unit, a weighted summing unit (WSYNT) 25R serving as the weighting unit, and a controlling unit (CTL) 26R as principal components.

In FIG. 1, reception units RCVU-1 to RCVU-K of users USR-1 to USR-K are each formed by an antenna element selecting unit 23R, array weight calculating unit 24R, and weighted synthesizing unit 25R. Further, in FIG. 1, RS1 indicates a received signal of the user USR-1, RS2 indicates a received signal of the user USR-2, and RSK indicates a received signal of the user USR-K.

As shown in FIG. 2, in the same way as the reception system, the transmission system 20S has an antenna array unit 21 having a plurality of array antenna elements ANT-1 to ANT-N arranged in a circular state and a cylindrical reflection plate (RFLCT) 211, an RF unit (RF front end unit) 22S, an antenna element selecting unit (ANTSEL) 23S, an array weight calculating unit (ARCAL) 24S serving as the array weight generating unit, a weighting unit (WEIT) 25A serving as the weighting unit, a controlling unit (CTL) 26S, and an antenna switch (ANTSW) 27 as principal components.

In FIG. 2, the reception unit RCVU-1 of each user USR-1 is formed by an antenna element selecting unit 23S, array weight calculating unit 24S, and controlling unit 26S. Further, in FIG. 2, the transmission unit TRNSM1 of the user USR-1 is formed by a weighting unit 25A and an antenna switch 27.

The RF unit 22 converts received signals of the antenna elements ANT-1 to ANT-N to base bands, digitalizes these by an analog/digital converter, and outputs the same as received signals X1, X2, . . . , XN.

FIG. 1 shows only the reception, but in the case of transmission, the RF unit 22S is further provided with a transmission/reception switch unit (duplexer) converting base band signals up to the transmission frequency to enable the antenna elements ANT-1 to ANT-N to be shared by the transmission and reception.

The antenna element selecting unit 23 outputs the received signals using all antenna elements ANT-1 to ANT-N or using M number of antennas designated by the controlling unit 26 according to the control information from the controlling unit 26.

The array weight calculating unit 24 calculates the array weights according to the criterion of MMSE etc. by using the output signals from the antenna element selecting unit 23 and the control information from the controlling unit 26.

The array weight calculated by the array weight calculating unit 24 is sent to the controlling unit 26 and weighted summing unit 25R or the weighting unit 25A.

The weighted summing unit 25R sums output signals of the antenna element selecting unit 23 by the array weights sent from the array weight calculating unit 24 and outputs the result as the received signal of the user.

Further, the weighting unit 25A weights the transmission signal of the user according to the array weights sent from the array weight calculating unit 24.

The controlling unit 26 determines the combination of antenna elements used for communications (antenna element determining unit) based on the array weight information sent from the array weight calculating unit 24 and sends the information to the antenna element selecting unit 23 and array weight calculating unit 24.

Further, the controlling unit 26 learns the period for determination of the antenna elements so as to track the fluctuation rate of the signal environment with the other party of the transmission/reception, adjusts the period of determination of the antenna elements based on the learned result, and notifies a timing for determination of the antenna elements to the antenna element selecting unit 23 (controlling unit of the antenna element determination period).

More concretely, the controlling unit 26 has a function as a directionality controlling unit for controlling the directionality of the array antenna elements based on the weighted signal and has a function of intermittently determining the antenna elements. Further, it has a function as a controlling unit of the antenna element determination period for adjusting the period of the determination of the antenna elements used for communications based on the information of the antenna elements determined by the controlling unit 26.

The period is adjusted by comparing the combination of antenna elements determined by the controlling unit 26 and the combination of antenna elements determined the previous time, making the period long when the two combinations are the same, and making the period short when the combinations differ.

Further, the period may be adjusted by calculating the inner product of a present array weight vector in the antenna elements determined by the controlling unit 26 and a previous array weight vector, making the period long when the inner product value is larger than a threshold value, and making the period short when the inner product is smaller than a threshold value.

Further, the controlling unit 26 adjusts the period so that becomes a time set in advance when the period is longer than the set time. However, it may also calculate the inner product of a present array weight vector in an antenna elements determined by the controlling unit 26 and a previous array weight vector and adjust the period so that all antenna elements are used at the next generation of weight coefficients when the inner product value is smaller than a threshold value.

Below, the controlling unit 26 will be explained in further detail.

Here, for the convenience of the explanation, the reception by the user 1 will be explained as an example (see FIG. 3). When there are a plurality of users, they independently perform the same processing as that of the user 1.

Figure 3:
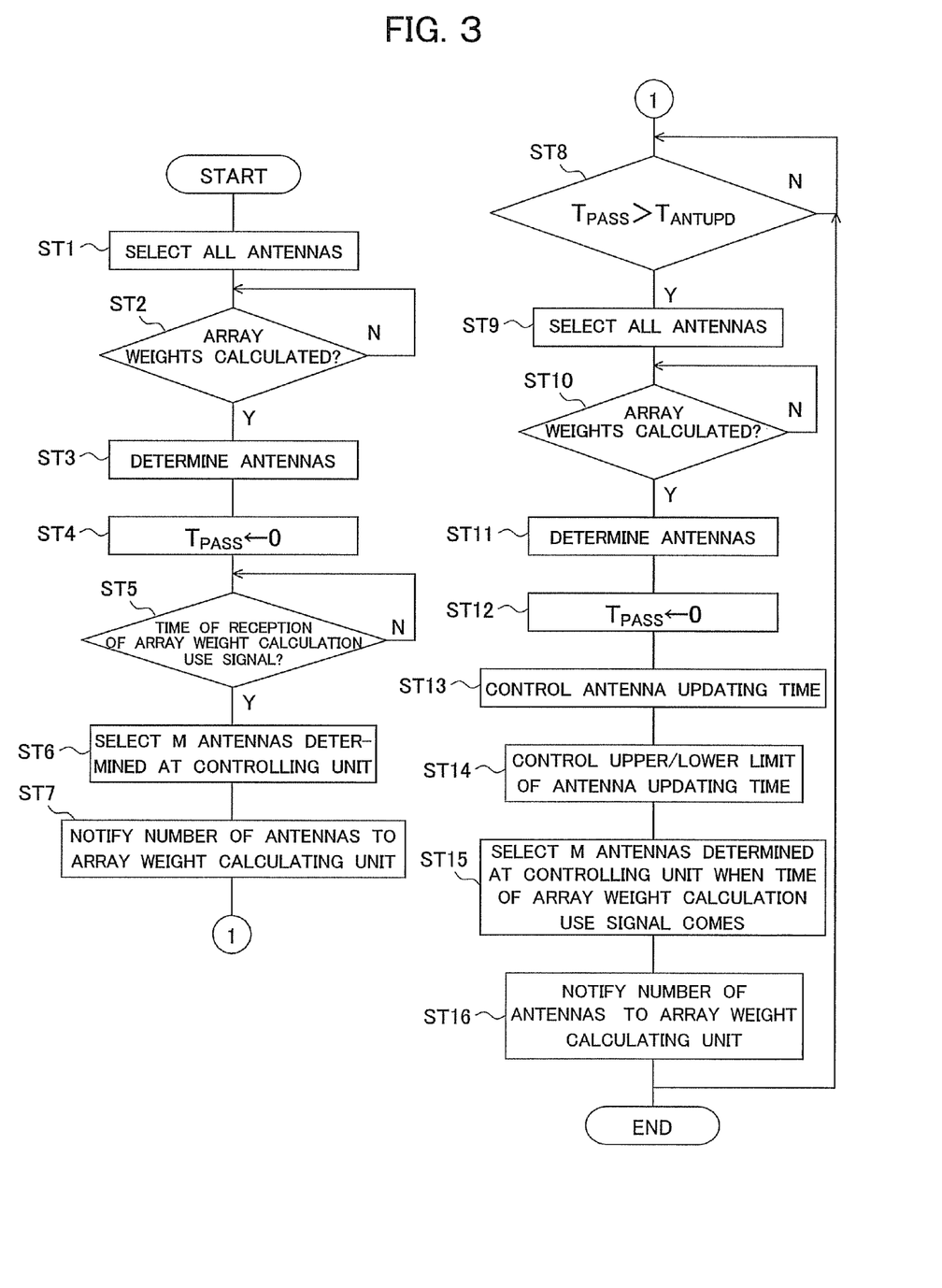
FIG. 3 is a flow chart for explaining a control operation of a controlling unit according to the present embodiment.

FIG. 3 is a flow chart for explaining the control operation of the controlling unit according to the present embodiment.

Figure 4:
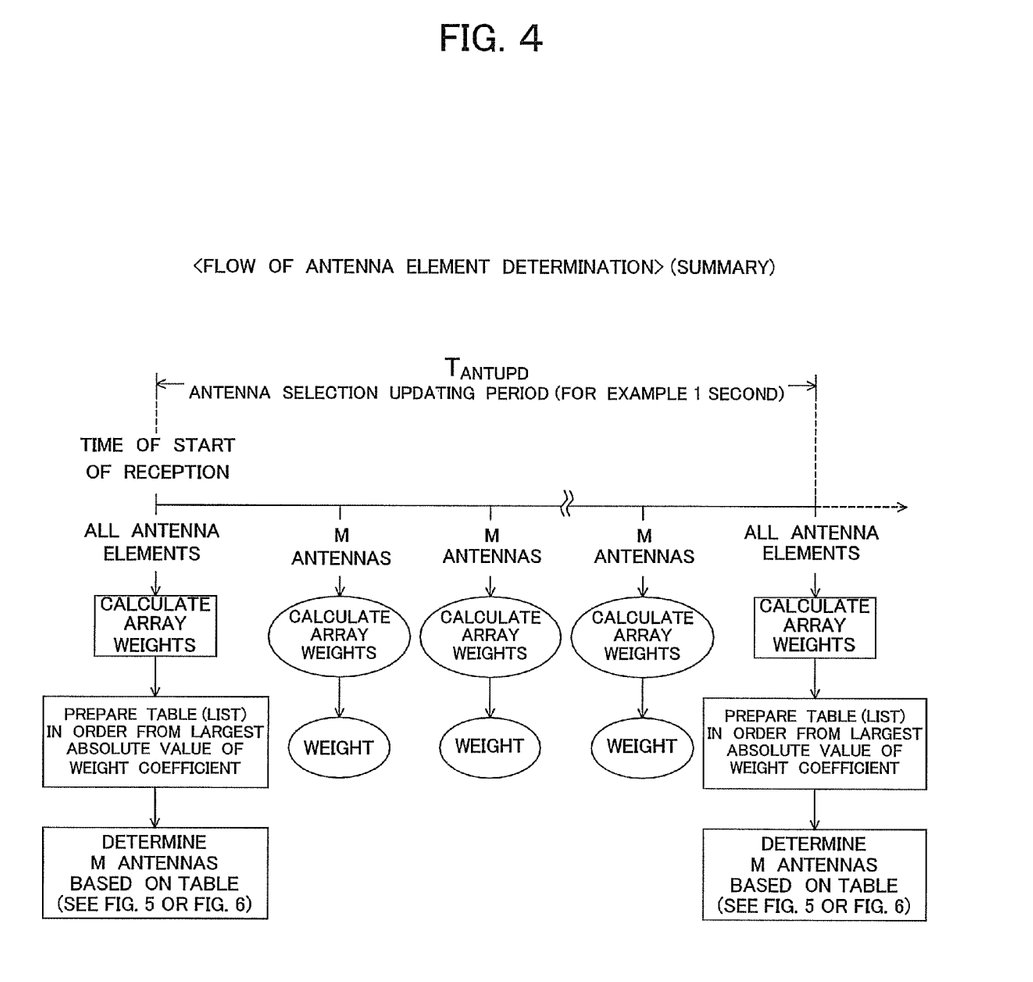
FIG. 4 is a diagram showing an outline of antenna element determination processing.

FIG. 4 is a diagram showing an outline of the antenna element determination processing.

At the time of start of reception, the controlling unit 26 controls the antenna element selecting unit 23 so that all of the antenna elements provided in the base station are used (ST1).

The array weight calculating unit 24 uses the received signals X1, X2, . . . , XN of all of the antenna elements to calculate array weights W1, W2, . . . , WN according to the standard of MMSE etc. The controlling unit 26, when receiving these calculation results, determines the antennas used for communications (ST2, ST3)

Figure 5:
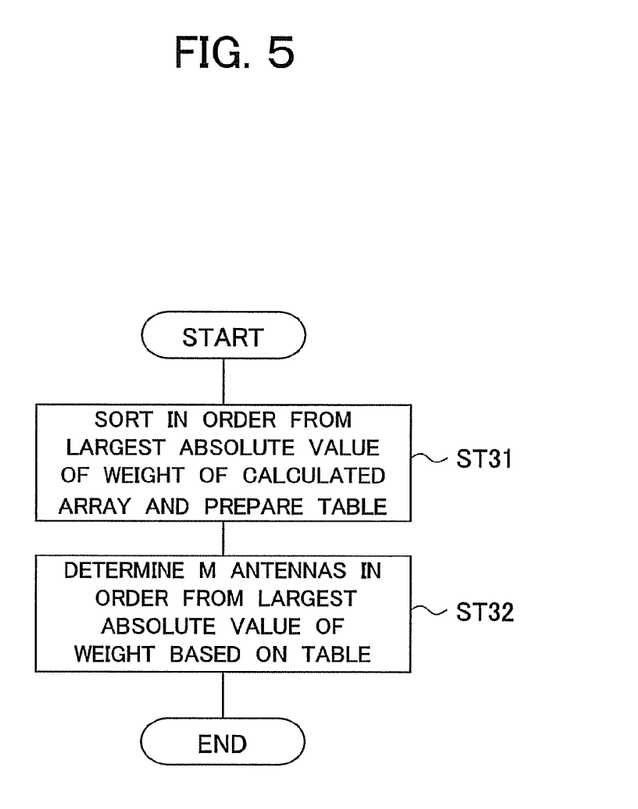
FIG. 5 is a flow chart showing a first example of determination of a selected antenna.

In the determination of the antennas at step ST3, for example, in the example shown in FIG. 5, first, the (numbers of the) antennas are sorted in the order from the largest absolute value of the array weights (weight coefficient) calculated at the array weight calculating unit 24 and stored as a table (list). When there are a plurality of users, these sorted tables (lists) are prepared and stored for the number of users (ST31).

These types of sorting and table preparation are continuously carried out after constant time intervals. Note that, the "constant time interval" is referred to as an "antenna selection updating time" (for example 1 second) $T_{ANTUPD}$ here.

Next, based on the prepared table, M (<N) number of antenna elements are determined in order from the largest absolute value of the array weight (ST32).

In FIG. 3, 0 is entered for the predetermined elapsed time after the preparation of the table (elapsed time after table preparation) $T_{PASS}$ (ST4). When the timing of reception of the signal for calculation of the array weights arrives (ST5), the antenna element selecting unit 23 is made to select the M number of antenna elements determined by the controlling unit 26 (ST6) and made to continuously use those M antennas until the next instruction is issued (until the antenna selection updating time $T_{ANTUPD}$ passes) (ST7).

Figure 6:
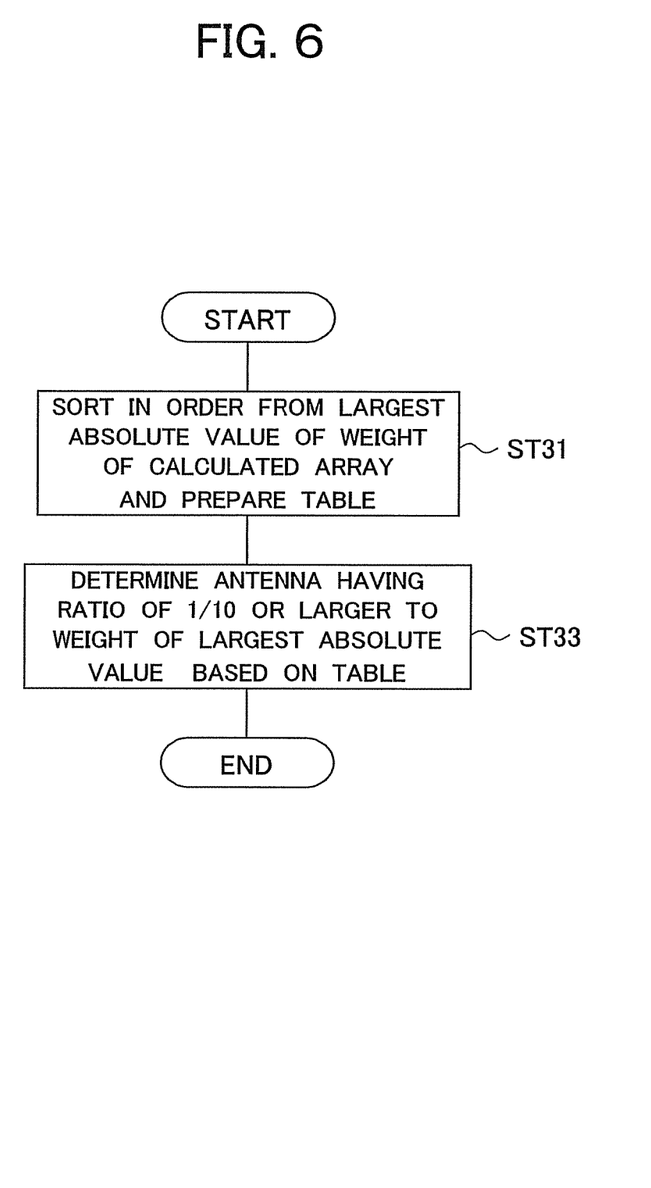
FIG. 6 is a flow chart showing a second example of determination of a selected antenna.

Note that, as another method of determination of antennas, there is also a method the same in selecting antenna elements according to the array weights calculated according to the criterion of the MMSE etc., but not determining fixed M number of elements, but determining antenna elements as antenna elements used for communication having absolute values of for example 1/10 or more in comparison with the factor shown in FIG. 6, i.e., the maximum weight of the absolute values of the array weights (ST33) as shown in FIG. 6.

In this way, the antenna elements used for communications are determined according to the array weights calculated according to the MMSE etc., therefore the optimum antenna elements can be always selected irrespective of the complex radio wave environment.

Next, when the elapsed time $T_{PASS}$ after the table preparation exceeds the antenna selection updating time $T_{ANTUPD}$, in other words, when the antenna selection updating time $T_{ANTUPD}$ elapses after the table preparation (ST8), the controlling unit 26 makes the antenna element selecting unit 23 select all antenna elements again (ST9) and the array weight calculating unit 24 calculates the array weights based on the MMSE etc. for all antenna elements (ST10). Then, the controlling unit 26 determines the antenna elements used for the following communications by the newly calculated array weights (ST11).

After determining the antenna elements, 0 is entered for the elapsed time $T_{PASS}$ after the table preparation (ST12) for control of the antenna selection updating-time $T_{ANTUPD}$ (ST13). Further, for example the upper/lower limit of the antenna selection updating time $T_{ANTUPD}$ is controlled (ST14). When the timing for receiving the signal for calculating the array weights arrives, the antenna element selecting unit 23 is made to select M number of antenna elements determined by the controlling unit 26 (ST15) and made to continuously use those M antennas until the next instruction is issued (until the antenna selection updating time $T_{ANTUPD}$ passes) (ST16).

Figure 7:
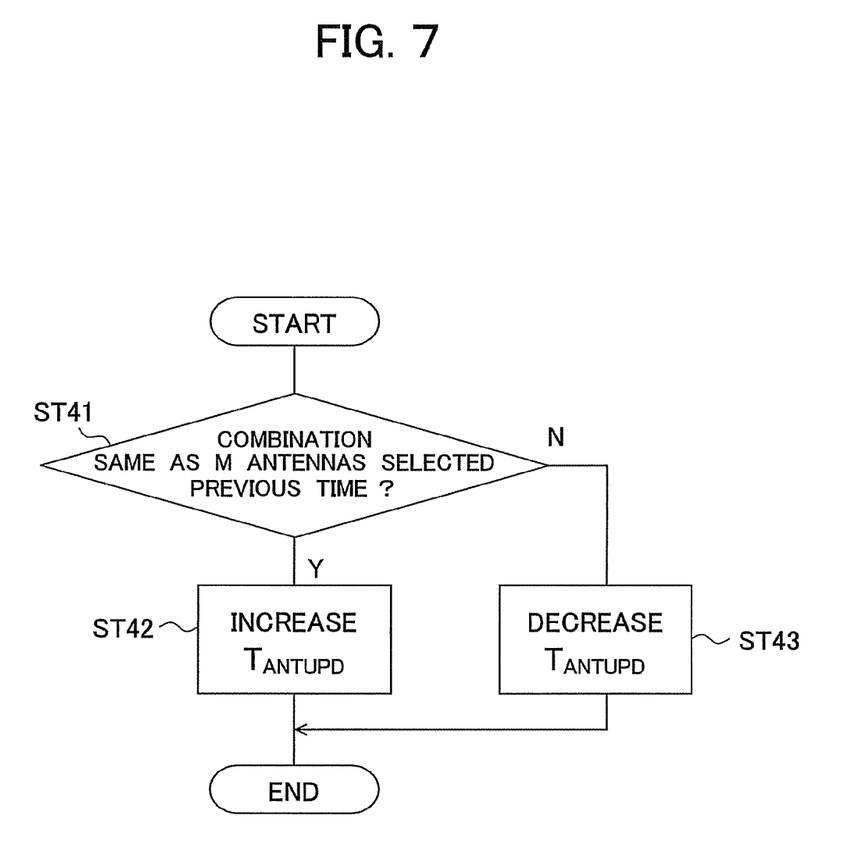
FIG. 7 is a flow chart showing a first example of control of an antenna selection updating time.

Further, the controlling unit 26, for example as shown in FIG. 7, compares the combination of the present selected antenna elements and the antenna element selected the previous time (ST41).

When the combinations are the same, the antenna selection updating time $T_{ANTUPD}$ is increased since the signal environment is stable (ST42).

On the other hand, when the combinations differ, the radio wave environment is not stable, therefore the selection must be immediately updated, so the antenna selection updating time $T_{ANTUPD}$ is decreased (ST43).

By adjusting the antenna selection updating time in this way, it is possible to control the array to track fluctuations of the radio wave conditions with the other party of the transmission/reception and, at the same time, reduce the number of times of useless determination and selection of antenna elements, and reduce the amount of processing.

Figure 8:
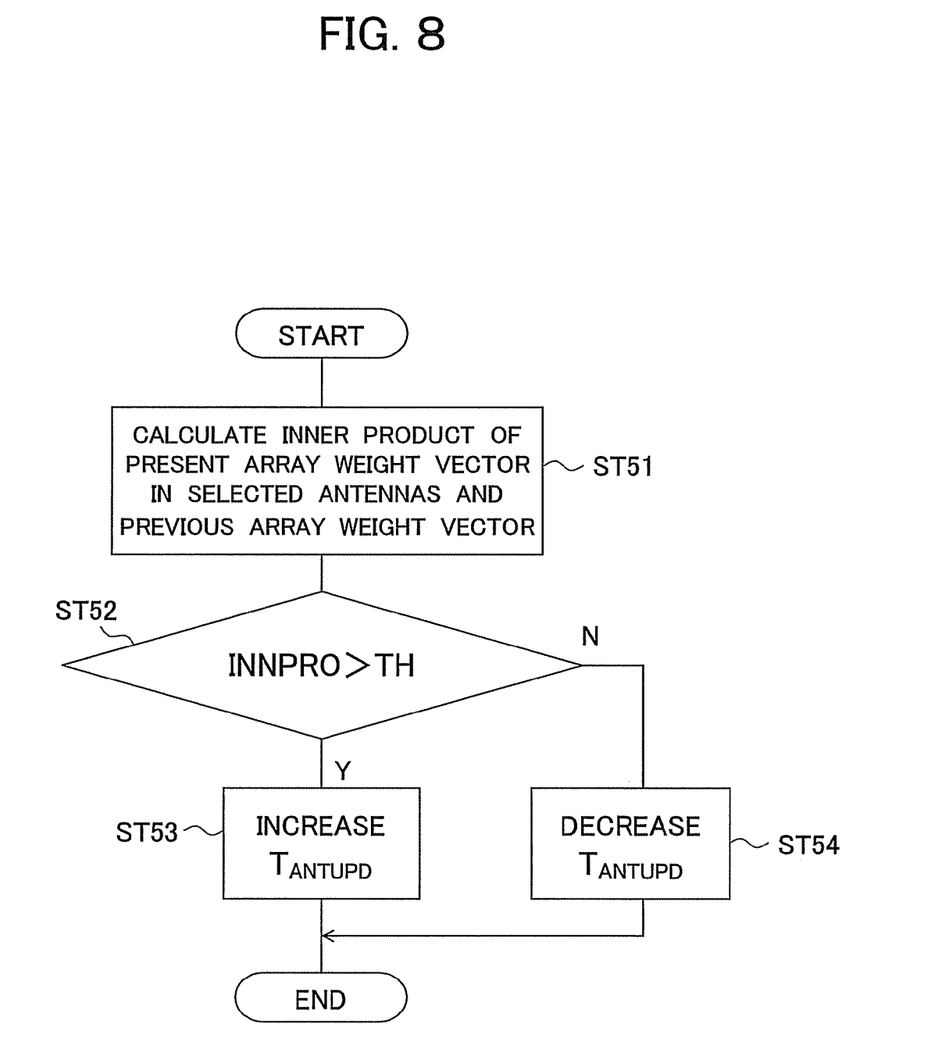
FIG. 8 is a flow chart showing a second example of control of an antenna selection updating time.

Note that, for the method of learning the antenna selection updating time, as described above, other than the method of comparing the combination with the M number of antenna elements selected the previous time, as shown in FIG. 8, there is also the method of using an array weight as a vector, calculating an inner product INNPRO with the array weight vector calculated the previous time (ST51), decreasing the antenna selection updating time $T_{ANTUPD}$ when the inner product becomes lower than the threshold value (for example 0.5) TH (ST52, ST53), and increasing the antenna selection updating time $T_{ANTUPD}$ when the inner product becomes higher than the threshold value TH (ST52, ST54).

Figure 9:
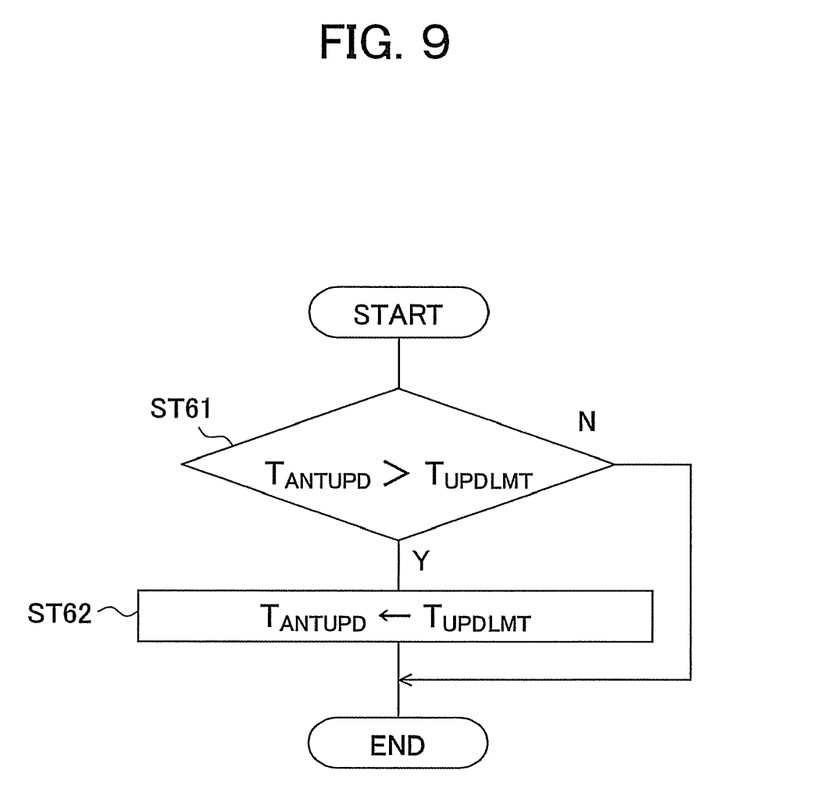
FIG. 9 is a flow chart showing an example of control of the upper/lower limits of an updated antenna updating time.

Further, when the antenna selection updating time $T_{ANTUPD}$ becomes too long, there is a possibility that the terminal moves to the outside of the directionality range of the selected antennas, therefore an updating upper limit time $T_{UPDLMT}$ of the antenna selection updating time $T_{ANTUPD}$ is set.

For example, in the example of FIG. 9, when the antenna selection updating time exceeds the updating upper limit time $T_{UPDLMT}$, the updating upper limit time $T_{UPDLMT}$ of the antenna selection updating time $T_{ANTUPD}$ is entered for it (ST61, ST62).

Figure 10:
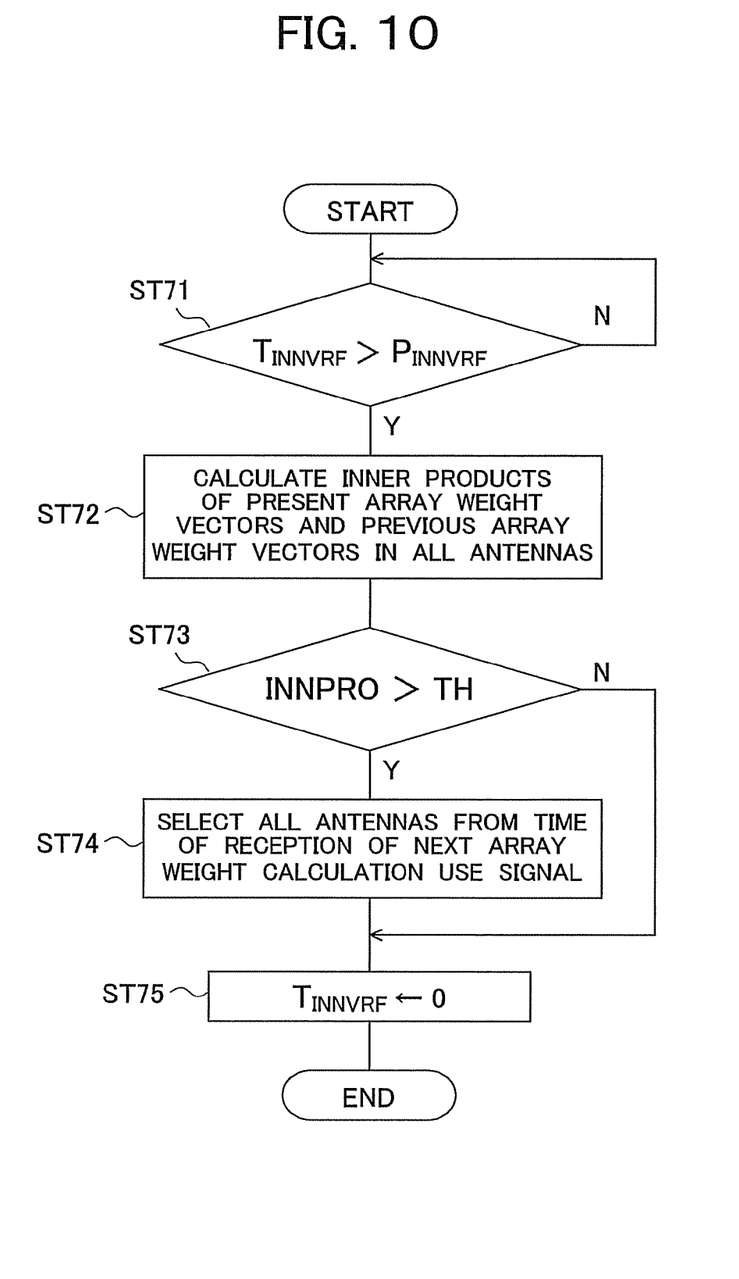
FIG. 10 is a flow chart showing an example of control for correction of the antenna selection updating time.

As another method, as shown in FIG. 10, a method of calculating the inner product of a previous array weight and a present array weight by a period (inner product verification period) $P_{INNVRF}$ shorter than the antenna selection updating time $T_{ANTUPD}$, but longer than the array weight calculation period (period) $P_{AWCAL}$, and using all antenna elements when the inner product becomes lower than a threshold value (shortening the antenna selection updating time $T_{ANTUPD}$ can be considered (ST71 to ST75).

In FIG. 10, when a time $T_{INNVRF}$ after the inner product verification exceeds the inner product verification period $P_{INNVRF}$ (ST71), inner products INNPRO of present array weight vectors and previous array weight vectors in all antennas are calculated (ST72). When an inner product INNPRO becomes over the threshold value TH, all antennas are selected from the time of reception of the next array weight calculation use signal (ST74), and 0 is entered the time $T_{INNVRF}$ after the inner product verification, When an inner product INNPRO becomes larger than the threshold value TH, 0 is entered into the time $T_{INNVRF}$ after the inner product verification without going through the processing of step ST74.

Figure 11:
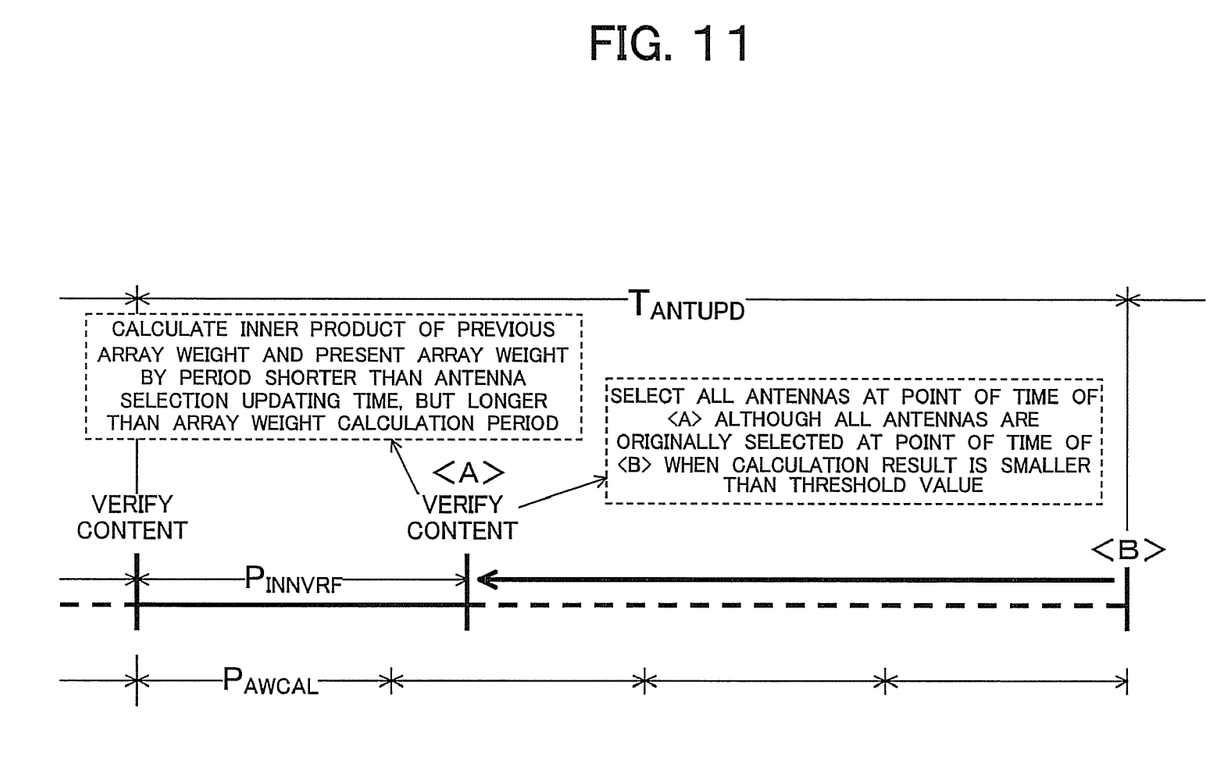
FIG. 11 is a diagram schematically showing an outline of the processing in FIG. 10.

FIG. 11 schematically shows an outline of the processing in FIG. 10.

In FIG. 11, in the same way as explained above, the inner product of a previous array weight and a present array weight is calculated at a period (inner product verification period) $P_{INNVRF}$ shorter than the antenna selection updating time $T_{ANTUPD}$, but longer than the array weight calculation period $P_{AWCAL}$.

Then, when the calculated result is smaller than the threshold value TH, while originally all antennas are selected at the point of time indicated by <B> in the figure, all antennas are selected at the point of time indicated by <A>.

Further, in order to suppress the frequent determination of the antenna elements in the controlling unit 26, in the present embodiment, in a case where array elements are arranged in a circular state, a reflection plate or directional antennas are used to forcibly block reception in unnecessary directions.

Due to this, frequent determination of the antenna elements in the controlling unit 26 is suppressed, the period of determination of the antenna element array element can be made longer, and the amount of processing can be relatively reduced.

For example, a reflection plate is used to block reception by array elements not facing the mobile terminal user direction (same for directional antennas), the antenna elements on the opposite side are not hastily selected, and the antenna elements facing this user direction are generally stably selected.

By such factors and the learned features of the determination period of the antenna elements of the present embodiment, frequent determination of the antenna elements is not necessary, so the amount of processing can be relatively reduced.

Further, in the present embodiment, since a reflection plate or directional antennas are set and utilized, the signals are received and/or transmitted in only the required direction, so the reception sensitivity and transmission power are increased a lot in the transmission/reception direction and the range which can be covered by one base station is extended.

Figure 12:
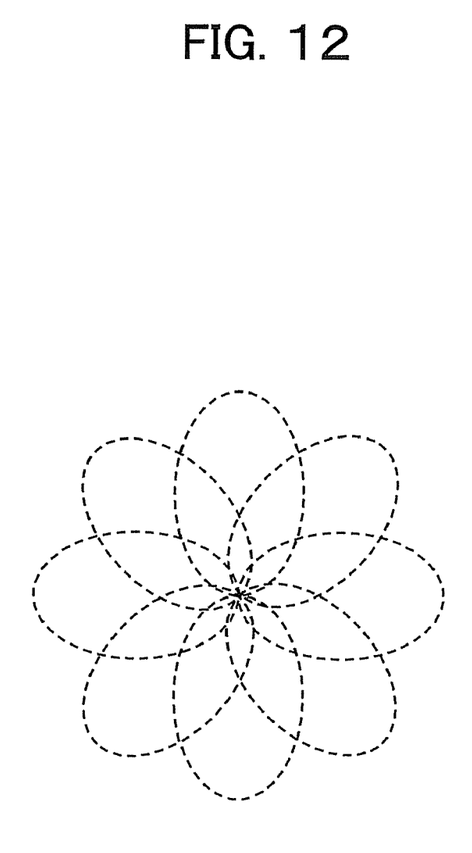
FIG. 12 is a diagram showing an example of an antenna element directionality.

Either a reflection plate or directional antennas may be utilized. Simultaneous use is not necessary. Further, when utilizing directional antenna elements, desirably the directionalities of the elements can cover half the plane facing the outside of the circle. However, when combining the directionalities of all elements shown in FIG. 12, antenna elements having directionalities large enough to cover the entire plane can be utilized as well.

The provision of a reflection plate or use of directional antennas improves the effect of the present invention, but is not an essential requirement of the present invention.

Further, in the transmission system 20S shown in FIG. 2, when using array weights calculated from the received signals, since antennas other than the determined antennas do not have weights, their outputs are turned OFF at the antenna switch 27.

As described above, by applying the adaptive array not to all antenna elements configuring the array for a certain user, but to only a part of the antenna elements suitable for communications, the amount of processing is reduced and the convergence speed of the adaptive array can be improved.

Simultaneously, by providing a reflection plate inside the circle or using directional antennas, reception from unrequired directions or/and transmission to unrequired directions are blocked, so the transmission power can be decreased or the distance which can be covered can be increased a lot.

As explained above, according to the adaptive array wireless communication apparatus 10 of the present embodiment, the directionality of the array antenna is controlled based on a weighted signal, the antenna elements are intermittently determined, and the period of determination of the antenna elements can be adjusted based on the information of the antenna elements determined by the controlling unit 26, therefore the following effects can be obtained.

Part of the antenna elements configuring the array is utilized and the adaptive array applied for reception or/and transmission for a certain user, therefore the amount of processing is small and the convergence speed is fast.

A relatively smaller DSP smaller by the amount of reduction of the amount of processing can be utilized, and the power consumption can be reduced.

Further, when selecting the antenna elements, the antenna elements are selected by using an optimum criterion such as the MMSE, therefore the optimum antenna elements can be always adaptively selected irrespective of the complex signal environment, the amount of processing is reduced without degrading the performance of the adaptive array, and the convergence speed can be improved.

The antenna elements are periodically determined, therefore fluctuations of the radio wave environment can be tracked. In addition, the switching period of the antenna elements is adjusted by learning, therefore the other party of transmission/reception having fast fluctuations in the radio wave environment can be tracked without delay, and it is not necessary to perform any useless operation with respect to another party of transmission/reception having slow or no fluctuations in the radio wave environment.

By selecting an optimum part of the antenna elements, making good use of the features of application of an adaptive array, utilizing directional antennas (or a reflection plate), and receiving or/and transmitting a signal in only the required direction, the distance which can be covered by the adaptive array can be increased or the emission power can be reduced.

For example, when utilizing directional antennas able to cover the upper half of a horizontal plane, a signal cannot be transmitted/received for the other half not covered by the directionality, but in the covered half, the reception sensitivity and transmission power can be doubled.

Accordingly, a transmission/reception apparatus equipped with an adaptive array according to the present embodiment, for example, a base station of mobile communications, can be extended in covered range and, as a result, the number of disposed base stations can be decreased.

Note that, in the adaptive array wireless communication apparatus 10 of the present embodiment, a reflection plate or directional antennas are used, therefore, by forcibly blocking reception from the unrequired directions, frequent determination of the antenna elements in the controlling unit 26 is suppressed, the period of selection of the antenna elements can be made longer, and the amount of processing can be relatively reduced.

For example, reception by antenna elements not facing the mobile terminal user direction is blocked by a reflection plate (same for directional antennas), therefore the antenna elements on the opposite side are not hastily selected, and the antenna elements facing this user direction are generally stably selected.

Due to this and due to the learned features of the period of determination of the present embodiment, frequent determination of the antenna elements is not necessary, and it is possible to relatively reduce the amount of processing.

Industrial Applicability

According to the adaptive array wireless communication apparatus of the present invention and the method of same, the amount of processing is small and convergence speed is fast and antenna elements suitable for the transmission/reception can be adequately selected, therefore this can be applied to the base station etc. of a mobile terminal or other mobile communications system.

The invention claimed is:

1. An adaptive array wireless communication apparatus having an array antenna configured by a plurality of antenna elements, comprising
    an array weight generating unit generating weight coefficients for received signals received at the plurality of antenna elements,
    an antenna element determining unit determining antenna elements used for transmission/reception based on the weight coefficients generated at the array weight generating unit,
    a weighting unit weighting each received signal or/and each transmission signal of the antenna elements determined by the antenna element determining unit,
    a directionality controlling unit controlling the directionality of the array antenna by the weighting by the weighting unit, and
    a controlling unit of an antenna element determination period controlling the antenna element determining unit so that the determination of the antenna element is intermittently carried out, and adjusting the period of determination at the antenna element determining unit based on information of the antenna elements determined by the antenna element determining unit,
    wherein the controlling unit of the antenna element determination period calculates the inner product of a present array weight vector in an antenna elements determined by the antenna element determining unit and a previous array weight vector and controls the antenna element determining unit so that all antenna elements are used at the next generation of weight coefficients when the inner product is smaller than a threshold value.

2. An adaptive array wireless communication apparatus as set forth in claim 1, wherein the period is adjusted by comparing a combination of antenna elements determined by the antenna element determining unit and a combination of antenna elements determined a previous time, making the period long when the two combinations are the same, and making the period short when the two combinations differ.

3. An adaptive array wireless communication apparatus as set forth in claim 1, wherein the period is adjusted out by calculating an inner product of a present array weight vector in the antenna elements determined by the antenna element determining unit and a previous array weight vector, making the period long when the inner product is larger than a threshold value, and making the period short when the inner product is smaller than the threshold value.

4. An adaptive array wireless communication apparatus as set forth in claim 1, wherein the controlling unit of the antenna element determination period adjusts the period so that it becomes a time set in advance when the period is longer than that set time.

5. A wireless communication method for wireless communication by an adaptive array wireless communication apparatus having an array antenna configured by a plurality of antenna elements, comprising
    an array weight generating step of generating weight coefficients for received signals received at the plurality of antenna elements,
    an antenna element determining step of determining antenna elements used for transmission/reception based on the weight coefficients generated at the array weight generating step,
    a weighting step of weighting each received signal or/and each transmission signal of the antenna elements determined by the antenna element determining step,
    a directionality controlling step of controlling the directionality of the array antenna by the weighting by the weighting step, and
    a controlling step of an antenna element determination period of controlling the antenna element determining step so that the determination of the antenna element is intermittently carried out, and adjusting the period of determination at the antenna element determining step based on information of the antenna elements determined by the antenna element determining step,
    wherein the controlling step of the antenna element determination period calculates the inner product of a present array weight vector in an antenna elements determined by the antenna element determining step and a previous array weight vector and controls the antenna element determining step so that all antenna elements are used at the next generation of weight coefficients when the inner product is smaller than a threshold value.

6. A wireless communication method as set forth in claim 5, wherein the period is adjusted by comparing a combination of antenna elements determined by the antenna element determining step and a combination of antenna elements determined a previous time, making the period long when the two combinations are the same, and making the period short when the two combinations differ.

7. A wireless communication method as set forth in claim 5, wherein the period is adjusted out by calculating an inner product of a present array weight vector in the antenna elements determined by the antenna element determining step and a previous array weight vector, making the period long when the inner product is larger than a threshold value, and making the period short when the inner product is smaller than the threshold value.

8. A wireless communication method as set forth in claim 5, wherein the controlling step of the antenna element determination period adjusts the period so that it becomes a time set in advance when the period is longer than that set time.

* * * * *